Jan. 26, 1954  B. D. WOOLLEY  2,667,232
POWER STEERING MECHANISM FOR AUTOMOTIVE VEHICLES
Filed May 8, 1951  2 Sheets-Sheet 1

INVENTOR
*Bruce D. Woolley*

BY *M. S. M^c Dowell*

ATTORNEY

Jan. 26, 1954  B. D. WOOLLEY  2,667,232
POWER STEERING MECHANISM FOR AUTOMOTIVE VEHICLES
Filed May 8, 1951  2 Sheets-Sheet 2

INVENTOR
Bruce D. Woolley
BY *M. D. McDowell*
ATTORNEY

Patented Jan. 26, 1954

2,667,232

UNITED STATES PATENT OFFICE 2,667,232

POWER STEERING MECHANISM FOR AUTOMOTIVE VEHICLES

Bruce D. Woolley, Johnstown, Ohio

Application May 8, 1951, Serial No. 225,147

4 Claims. (Cl. 180—79.3)

This invention relates generally to steering apparatus employed in imparting turning movement to the front wheels of motor vehicles. More particularly, the invention is concerned with steering mechanism of the type in which power obtained from the engine of an associated motor vehicle is utilized in assisting the vehicle operator in manipulating or governing the operating postions of the steering wheels.

In my prior Patent No. 2,062,774, granted December 1, 1936, there is disclosed a power-actuated steering mechanism for the wheels of automotive vehicles, and upon which the present invention constitutes an improvement.

The mechanism disclosed in my aforesaid patent employs a manually rotated shaft to the lower end of which is slidably keyed a sleeve containing a worm gear which, upon manual or power-effected rotation, operates the drag links and steering knuckles of a conventional steering mechanism to turn the ground-engaging front wheels of a motor vehicle in controlling their steering action. In order to impart movement to the sleeve on which the worm gear is mounted, power is obtained from the engine of an associated motor vehicle.

To this end, I disclose in my aforesaid patent friction gearing involving an engine-driven driver disk and a pair of spaced driven disks carried by the sleeve of the worm gear. Longitudinal movement of the sleeve is resisted by spring devices, in order that the driven disks normally will be slightly spaced from the outer periphery of the driver disk. This arrangement is such that thrusts imparted to the sleeve, and produced by resistance of the mechanism to turning movement of the steering wheels, will cause one or the other of the driven disks to engage with the driver disk, thereby producing power-effected rotation of the worm-carried sleeve which, in turn, results in desired operation of the steering means generally.

The use of the driver and driven friction disks in transmitting engine power to the worm gearing of the mechanism, has been found to be objectionable, primarily because of its lack of positiveness in operation and the tendency thereof to wear rapidly, losing normal mechanical effectiveness.

It is, therefore, one object of the present invention to provide power-driven motor vehicle steering mechanism in which toothed bevel gearing is utilized in the transmission of engine power to the worm gearing, the toothed gears being supplemented by frictional clutches which rotate in unison with the toothed bevel gearing and which are engaged or disengaged to transmit rotary power to the worm gearing sleeve by longitudinal movement of the sleeve on the steering post or shaft of the mechanism.

It is another object of the invention to provide safety means in the form of an automatic clutch between my improved steering apparatus and the motor vehicle engine associated therewith, whereby to admit of manual operation on the part of the steering mechanism in the event the vehicle engine is not in operation.

Another object of the invention is to provide power-actuated motor vehicle steering mechanism which is generally of new and improved construction, operates efficiently over prolonged periods of time, requires little manual attention, and may be built at a comparatively low and reasonable cost.

Other objects of the invention and the various advantages and characteristics of the present construction will be apparent from a consideration of the following detailed description.

The invention consists in the several novel features which are hereinafter set forth and are more particularly defined by claims at the conclusion hereof.

In the drawings which accompany and form a part of this specification or disclosure, and in which like numerals of reference denote corresponding parts throughout the several views.

Figure 1:
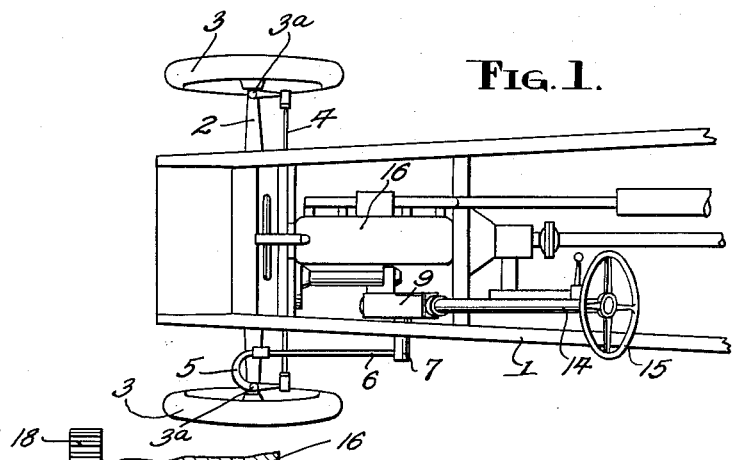
Fig. 1 is a top plan view of the forward portion of the chassis of the motor vehicle, and disclosing the latter equipped with the improved steering gear mechanism constituting the present invention.
Figure 2:
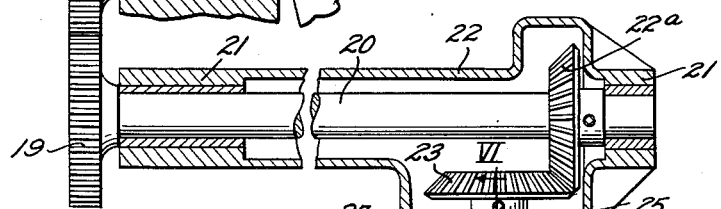
Fig. 2 is a fragmentary horizontal sectional view taken through the steering gear mechanism and associated engine-driven power-transmitting means.
Figure 3:
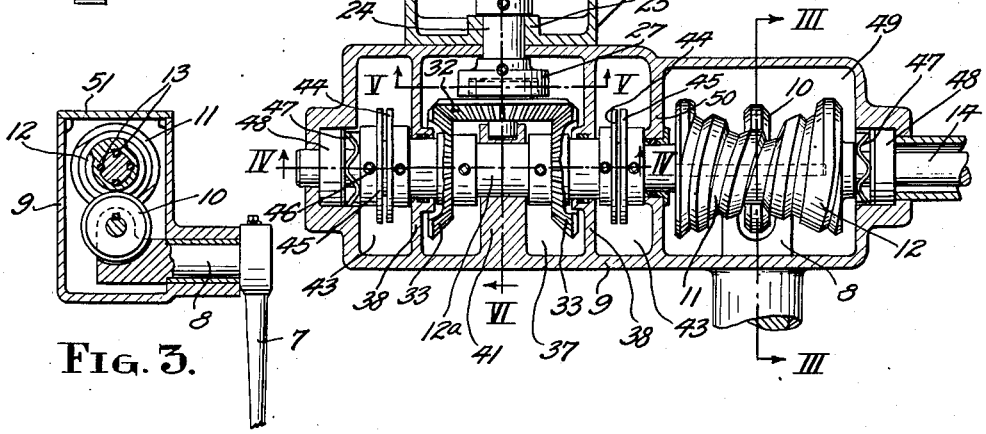
Fig. 3 is a vertical transverse sectional view taken through the worm gear mechanism of the steering apparatus, the plane of the figure being indicated by the line III—III of Figure 2.
Figure 4:
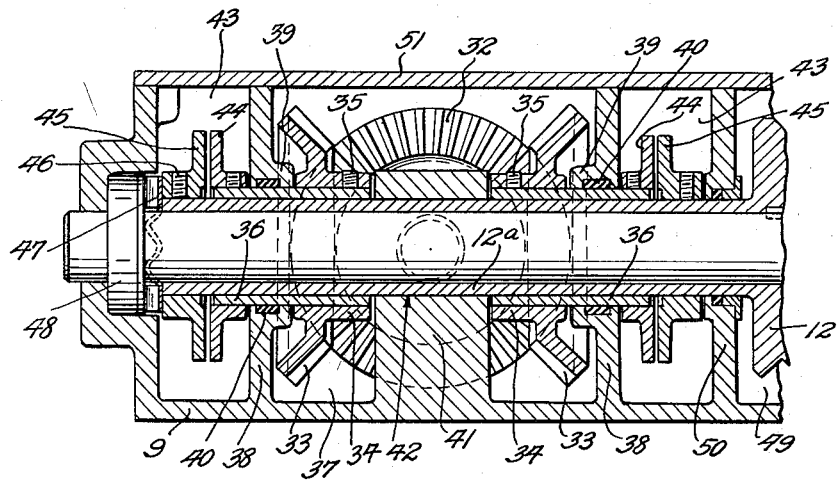
Fig. 4 is a vertical longitudinal sectional view taken through the mechanism on the plane disclosed by the line IV—IV of Fig. 2.
Figure 5:
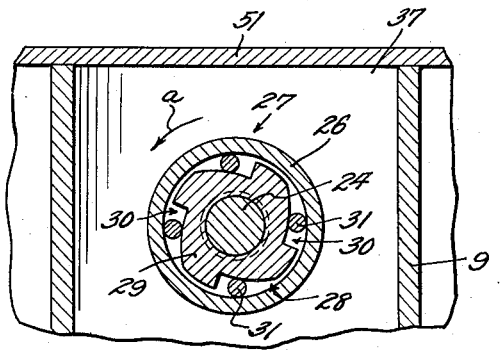
Fig. 5 is a similar view on the line V—V of Fig. 2.
Figure 6:
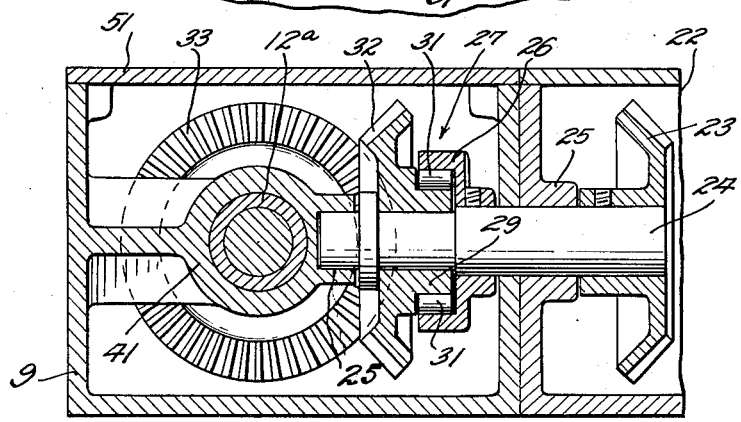
Fig. 6 is a sectional view on the line VI—VI of Fig. 2.

Referring more particularly to the drawings, the numeral 1 designates the frame or chassis of a motor vehicle. This frame at its forward end is provided with the usual front axle 2, and upon the ends of the latter there are mounted the forward ground-engaging steering wheels 3 of the vehicle. The latter are shown as being united by the usual cross link 4. One of the supporting knuckles 3a of the steering wheels is formed with a curved rearwardly extending arm 5, which, as usual, is connected with the forward end of a drag link shown at 6, the latter having its rear end connected with the depending portion of a frame-mounted oscillatory crank 7, the latter being carried in connection with the outer end of a transverse rock shaft 8. The inner end of the shaft 8 is arranged with a housing shown at 9, and is provided with a roller 10 so mounted as to engage with the helical grooves 11 formed in a substantially spool-shaped worm gear 12.

The worm gear 12 is keyed as at 13, or otherwise secured for limited longitudinal movement on the lower end of the manually operated steering shaft or post 14, the upper end of said shaft being provided with the customary manually operated steering wheel 15 which is disposed adjacent to the operator's position of the vehicle. By rotating the shaft 14 and the worm gear 12 keyed thereto, oscillating motion will be imparted to the roller 10 and its associated shaft 8, thereby rocking the crank 7 and imparting the desired steering movement to the ground wheels 3 of the vehicle.

To this conventional type of steering gear, I have provided an improved means for facilitating its operation by using power derived from the engine shown at 16 of the vehicle. As illustrated, the crank shaft 17, or other corresponding rotatable element of the engine, is provided with a spur gear 18, the latter meshing with a similar gear 19 fixed upon the forward end of a rotatably journaled shaft 20, the latter being supported in bearings 21 formed in connection with a gear housing 22. The shaft 20 at the end thereof opposite the gear 19 is provided with a bevel gear 22a, which meshes with a similar gear 23 fixed upon one end of a short transversely extending shaft 24, the latter being journaled in bearings 25 carried in connection with the gear casing or housing 22, the shaft 24 being disposed at right angles to the shaft 20.

The outer end of the shaft 24 is formed with a collar 26 constituting a part of an over-running clutch 27. As usual, the clutch 27 includes a circular chamber 28 which, in this instance, is formed in the collar 26. Rotatable with the shaft 24 and positioned in the chamber 28 is the inner ratchet-jawed member 29 of the clutch, the recesses 30 formed by the jaws on the outer periphery of the member 29 receiving rolling elements 31 which, when power is imparted to the clutch from the engine 16 in the direction indicated by the arrow a, will cause the member 29, through wedging engagement with the rolling elements 31, to rotate in unison with the collar 26 and the shaft 24. Movement in a direction opposite to that indicated by the arrow a frees the collar from driving relationship with the member 29. Also, stopping of the engine does not interfere with manual operation of the steering mechanism.

Rotatable with the collar 26 and freely mounted on the outer end of the shaft 24 is a bevel gear 32, the teeth of which being maintained in constant relationship with the teeth of a pair of complementary bevel gears shown at 33. The gears 33 are formed with hubs 34 which are fastened as at 35 for rotation with tubular quills or outer sleeves 36, the latter being loosely rotatable on a sleeve 12a which carries the worm gear 12.

The gears 32 and 33 are arranged in a compartment 37 formed in the housing 9 between divisional walls 38 thereof. These walls are formed with bearings 39 for the reception of the quills 36, the bearings containing yieldable packings 40, the latter permitting the compartment 37 to contain fluid lubricants. Within the compartment 37 there is provided a bearing web 41 which is formed with a longitudinally extending opening 42 in which is rotatably mounted the sleeve 12a which, in turn, is supported on the steering post or shaft 14.

The quills 36 extend into chambers 43 which are formed in the housing 9 in spaced and sealed relation from the compartment 37. Arranged in each of the chambers 43 is a disk-type clutch. Each of these clutches comprises a driving member 44 fixed to rotate with one of the quills 36 and arranged in adjacent relationship to a complemental driven member 45, which is fixed to rotate, as shown at 46, on the sleeve 12a. The sleeve at each end thereof bears against a corrugated spring washer 47, and each of the latter has seating engagement with a collar 48 fixed on the steering post or shaft 14.

In operation, whenever the steering shaft 14 is turned to the right or left, revolving the worm gear 12 therewith, longitudinal thrust forces are imparted to the gear 12 and its associated sleeve 12a. These thrust forces are produced as a result of the power required to rock the shaft 8 in operating the steering arms and links in a manner turning the front ground-engaging wheels 3 about their vertical axes.

The longitudinal movement of the sleeve 12a is resiliently resisted by the corrugated spring washers 47, but sufficient longitudinal movement is permitted on the part of the sleeve 12a to cause one of the driven members 45 of a disk clutch to engage with an engine driven driving member 44. By this construction, the power of the engine is directly utilized in facilitating steering movement of the front wheels of a motor vehicle. In the event the engine is not running, the steering gear may be actuated manually in a conventional way. It will be noted that in the design of the housing 9, the compartment 37 containing the toothed bevel gearing, and the compartment 49 of said housing containing the worm bearing, may be provided with fluid or solid lubricants, whereas the clutch chambers 43 may be kept dry and free from lubricants. This feature is made possible by the packings contained in the divisional walls 38 and also in a divisional wall 50 which separates the compartment 49 from an adjacent chamber 43. These various compartments and chambers may be covered by a removable lid shown at 51.

It will be observed that in case the engine 16 should not be in operation for any reason, or should stop while an associated motor vehicle is being driven down a hill or other incline, the vehicle may be guided through ordinary manual control.

This valuable safety feature is attained by the provision of the over-running clutch 27, which releases the steering gear mechanism from an engine-driven member, enabling the steering gear mechanism to operate in response to manually applied effort solely. The over-running or "free-wheeling" clutch frees the steering apparatus in a manner enabling the same to operate independently of the engine and in a conventional way.

It will be understood that in lieu of employing an over-running clutch, other suitable and equivalent types of automatic clutch mechanism may be used for disconnecting the manually-operated member of the steering mechanism from the power-driven member or members. For example, I may use a governor-controlled clutch which when the engine is idle disconnects the engine-driven member from an associated manually rotatable part. Due to the use of the bevel gears 32 and 33, the gear 32 will revolve in the same direction irrespective of which clutch 44 and 45 is engaged when manual operation of the steering mechanism is effected. This feature makes possible the use of an over-running clutch.

The herein described apparatus is exceedingly efficient in operation and is characterized by its long operating life and freedom from mechanical repair, replacement and adjustment of parts.

The invention is not to be understood as restricted to the details set forth, since these may be modified within the scope of the appended claims, without departing from the spirit and scope of the invention.

I claim:

1. In a motor vehicle steering mechanism, a manually rotatable steering post, a housing in which the lower end of said post is journaled for rotary movement, a sleeve member slidably keyed to said post, a worm gear fixed upon said sleeve member for rotation in unison therewith, means in engagement with said worm gear to turn the associated steering wheels of the motor vehicle, resilient means engaged with said sleeve member providing for limited longitudinal movement of the member on said post upon the application of wheel-turning forces to the post, a pair of spaced clutches, each of said clutches embodying a driven member fixed to rotate with the sleeve member and a driving member normally spaced from said driven member and rotatably mounted independently of the sleeve member, the spacing of the driven members of said clutches on said sleeve member being such as to cause the driven members to contact the driving members when said sleeve member responds to the application of wheel-turning forces, toothed gearing driven by the associated engine of the motor vehicle for imparting rotation to the drive members of said clutches, and an over-running clutch mounted in connection with said toothed gearing and through which the engine power first passes before being applied to said gearing.

2. Engine power supplemented operating mechanism for steering control of the ground-engaging front wheels of motor vehicles, comprising: an internally chambered housing; a toothed drive gear supported for rotation within said housing; engine driven means imparting unidirectional rotation to said gear; oppositely facing complemental gears arranged in said housing having teeth disposed in constant mesh with those of the drive gear, whereby to cause said complemental gears to rotate in opposing directions; shaft means supported in said housing for manual and engine power rotation and limited longitudinal thrust movement; a pair of longitudinally spaced clutches arranged in said housing axially of said shaft means, said clutches including driving and driven disks; means joining the driving disks of said clutches with said complemental gears for rotation in unison therewith in the same directions; means joining the driven disks of said clutches with said shaft means to cause the latter to rotate in unison with the driven disks and in the same directions; resilient means maintaining normally the driving and driven disks of said clutches in spaced non-driving relationship; and thrust-developing actuating gearing operated by turning movement of said shaft means, said actuating gearing serving to control the steering positions of associated front ground wheels of a motor vehicle, the longitudinally directed thrusts imparted to said shaft means serving to bring the disks of one or the other of said clutches, against the resistance of said resilient means, into engine power-transmitting engagement with each other, whereby to rotate said shaft means by engine power.

3. Power actuated mechanism for controlling the steering positions of the front ground-engaging wheels of motor vehicles as defined in claim 2, and wherein the mechanism is further characterized by the inclusion of an over-running clutch device in the engine driven means for rotating the drive gear.

4. Engine power supplemented operating mechanism for the steering control of front ground-engaging wheels of motor vehicles, comprising: a housing; shaft means supported in said housing; a pair of longitudinally spaced clutch assemblies arranged in said housing and disposed axially of said shaft means, said assemblies including longitudinally aligned driving and driven disk members; a rotatable toothed drive gear element supported in said housing; engine driven means for producing unidirectional rotation of said element; oppositely turning gearing driven by said element for rotating the driving disk members of said clutch assemblies in relatively opposite directions; means uniting the driven disk members of said clutch assemblies directly with said shaft means for rotation in unison therewith, said driving disk members being normally free from said shaft means; means actuated by normally produced rotational movement of said shaft means to bring the driving and driven disk members of one or the other of said clutch assemblies into relative power-transmitting engagement to rotate said shaft means; and gearing actuated by the rotation of said shaft means for controlling the steering positions of the front ground wheels of an associated motor vehicle.

BRUCE D. WOOLLEY.

References Cited in the file of this patent

UNITED STATES PATENTS

| Number | Name | Date |
|---|---|---|
| 298,169 | Broomell | May 6, 1884 |
| 503,146 | Kramer | Aug. 15, 1893 |
| 666,307 | Fornoff | Jan. 22, 1901 |
| 2,062,774 | Woolley | Dec. 1, 1936 |
| 2,150,019 | Baule | Mar. 7, 1939 |